(12) United States Patent
Alexander et al.

(10) Patent No.: US 8,894,142 B2
(45) Date of Patent: Nov. 25, 2014

(54) STOWABLE ACTIVE MATERIAL ACTUATED REAR SEAT HEADREST

(75) Inventors: Paul W. Alexander, Ypsilanti, MI (US); Alan L. Browne, Grosse Pointe, MI (US); Nancy L. Johnson, Northville, MI (US); Rainer A. Glaser, Washington, MI (US); James Y. Khoury, Macomb, MI (US); Michael G. Carpenter, Romeo, MI (US); Leigh A. Berger, Brighton, MI (US); Jennifer P. Lawall, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 655 days.

(21) Appl. No.: 12/830,311

(22) Filed: Jul. 3, 2010

(65) Prior Publication Data

US 2012/0001461 A1    Jan. 5, 2012

(51) Int. Cl.
*B60N 2/48* (2006.01)
*B60R 21/02* (2006.01)

(52) U.S. Cl.
CPC .................................. *B60N 2/4873* (2013.01)
USPC ...................................... 297/216.12; 297/410

(58) Field of Classification Search
CPC .. B60N 2/4832; B60N 2/4935; B60N 2/4829; B60N 2/4873
USPC ................................... 297/408, 410, 216.12
See application file for complete search history.

(56) References Cited

U.S. PATENT DOCUMENTS

| | | | | |
|---|---|---|---|---|
| 2,652,101 A * | 9/1953 | Samsky et al. | ................ | 297/114 |
| 2,886,097 A * | 5/1959 | Katz | ............................ | 297/112 |
| 2,947,347 A * | 8/1960 | Spound | ........................ | 297/61 |
| 2,985,229 A * | 5/1961 | Shamblin | ..................... | 297/410 |
| 3,159,427 A * | 12/1964 | Lawson | ........................ | 297/410 |
| 3,397,911 A * | 8/1968 | Brosius, Sr. | ............ | 297/216.12 |
| 3,420,572 A * | 1/1969 | Bisland | ........................ | 180/271 |
| 3,454,303 A * | 7/1969 | Dangauthier | ................. | 297/396 |
| 3,554,599 A * | 1/1971 | Pietschmann | ................. | 297/353 |
| 6,447,062 B1 * | 9/2002 | Jaekel et al. | ................ | 297/284.7 |
| 7,367,626 B2 * | 5/2008 | Lawall et al. | ................. | 297/410 |
| 7,448,678 B2 * | 11/2008 | Browne et al. | ........... | 297/216.12 |
| 7,556,313 B2 * | 7/2009 | Browne et al. | ........... | 297/216.12 |
| 7,604,294 B2 * | 10/2009 | Santamaria | ................ | 297/250.1 |
| 7,798,570 B2 * | 9/2010 | Kwiecinski et al. | ..... | 297/216.12 |
| 2006/0170271 A1 * | 8/2006 | Coccoli | ........................ | 297/410 |
| 2009/0008972 A1 | 1/2009 | Kwiecinski et al. | | |
| 2010/0244505 A1 * | 9/2010 | Demick et al. | ........... | 297/188.04 |

FOREIGN PATENT DOCUMENTS

| CN | 101472761 | 7/2009 |
|---|---|---|
| DE | 199446404 | 4/2001 |
| DE | 102007041995 | 3/2009 |

* cited by examiner

*Primary Examiner* — David R Dunn
*Assistant Examiner* — Tania Abraham (57) ABSTRACT

An active headrest adapted for use with a rear seat, including a translatable, conformable, or otherwise reconfigurable shell, an active material actuator disposed within and drivenly coupled to the shell, and preferably including a linkage system fixedly coupled to the seat and/or shell, wherein the actuator is operable to cause the headrest to achieve one of a plurality of achievable positions.

10 Claims, 7 Drawing Sheets

FIG. 4a

STOWABLE ACTIVE MATERIAL ACTUATED REAR SEAT HEADREST

BACKGROUND OF THE INVENTION

1. Technical Field

This disclosure generally relates to stowable headrest assemblies particularly suited for use in rear seat assemblies, and more particularly, to a stowable rear seat headrest having an active material actuator.

2. Background Art

Rear seat headrests have long been used in vehicles to provide comfort and protection to passengers; however, design considerations relating thereto have resulted in conflicting aspects. For example, with respect to driver visibility when driving in reverse, parking, and changing lanes, the size of the headrest is preferably minimized; whereas passenger comfort requires a sufficiently large support surface. As such, removable and/or stowable rear seat headrests have more recently been developed to selectively improve visibility when the rear seats are vacant and/or rearward operation is being performed, and provide a sufficient support when a passenger is present and the vehicle is operated forwardly.

However, these types of headrests present various concerns in the art. For example, manually re-installing removable headrests can become labor intensive where a large volume of passengers changes and rearward actions are taken, and can often be difficult and cumbersome to perform. As such, the likelihood of improper re-installment may increase, and the choice to forego re-installment altogether may be taken. Instead of being completely removable, some conventional rear headrests are simply moved or "reconfigured" from the driver's sightline, automatically, without physically detaching the unit from the seat. While autonomous designs provide easy on-demand stowing and deployment, they are typically motorized, which further results in various concerns, including increased bulkiness, vehicle weight, consumption of interior cabin volume, noise, complexity, and cost.

BRIEF SUMMARY

In response to the afore-mentioned concerns, the present invention presents a stowable headrest that employs active material actuation to selectively stow and/or deploy the headrest. As such, the invention described herein is useful for providing increased rear passenger comfort when forward operation is performed, improved visibility for the driver when rearward operation is performed and where otherwise desired, convenient autonomous stowage/deployment operation, and reduced risk of improper function. By employing active material actuation, the invention is useful for reducing noise, the number of moving parts, and costs associated therewith, and for providing a compact package, which increases interior cabin space.

In general, the invention concerns an active headrest adapted for use with a rear seat, and operable to selectively stow and/or deploy autonomously. The headrest includes an exterior shell defining an interior space having a fixed volume, and an actuator disposed within the space. The actuator includes an active material element operable to cause the shell to achieve various, including stowed and deployed, positions and/or shapes, when the element is exposed to or excluded from an activation signal. To that end, the actuator is communicatively coupled to a source operable to generate the signal. In a preferred embodiment, at least one sensor is further coupled to the actuator, configured to determine an event or condition, and operable to cause deployment upon the occurrence of the event or condition.

Other aspects and advantages of the present invention will be apparent from the following detailed description of the preferred embodiment(s) and the accompanying drawing figures.

BRIEF DESCRIPTION OF THE DRAWINGS

Preferred embodiments of the invention are described in detail below with reference to the attached drawing figures of exemplary scale, wherein.

DETAILED DESCRIPTION

The following description of the preferred embodiments is merely exemplary in nature and is in no way intended to limit the invention, its application, or its uses. Disclosed herein is an active headrest 10 adapted for use with a seat 100, and operable to selectively stow and/or deploy autonomously (e.g., on demand, responsively, etc.). The headrest 10 disclosed herein can be employed in front and rear seats, and in various applications, such as with respect to vehicles, airlines, entertainment seats, etc., but is particularly suited for use with rear vehicle seats. The inventive headrest 10 employs active (or "smart") material actuation to cause or enable the headrest 10 to achieve various (e.g., stowed and deployed) positions or shapes; and, in a preferred embodiment, lock the headrest 10 in an achieved position (FIGS. 1-6*b*).

I. Active Material Discussion and Functionality

As used herein the term "active material" is defined as those materials or composites that exhibit a reversible change in a fundamental (i.e., chemical or intrinsic physical) property when subjected to an activation signal. Suitable active materials for use herein include, without limitation, shape memory alloys (SMA), shape memory polymers (SMP), and ferromagnetic SMAs (FSMA). Other active materials that may be utilized, with some changes to the proffered embodiments, include, but are not limited to, piezoelectric materials, electroactive polymers (EAP), magneto- and electrostrictives, and the like. Depending on the particular active material, the activation signal can take the form of, without limitation, an electric current, a temperature change, a magnetic field, a mechanical loading or stressing, or the like.

More particularly, shape memory alloys exist in several different temperature dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature (As). The temperature at which this phenomenon is complete is called the Austenite finish temperature (Af). When the shape memory alloy is in the Austenite phase and is cooled, it begins to change into the Martensite phase, and the temperature at which this phenomenon starts is referred to as the Martensite start temperature (Ms). The temperature at which Austenite finishes transforming to Martensite is called the Martensite finish temperature (Mf). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating.

The temperature at which the shape memory alloy remembers its high temperature form when heated can be adjusted by slight changes in the composition of the alloy and through heat treatment. In nickel-titanium shape memory alloys, for instance, it can be changed from above about 130° C. to below about −100° C. The shape recovery process occurs over a range of just a few to several degrees and the start or finish of the transformation can be controlled to within a degree or two depending on the desired application and alloy composition. It is appreciated that the mechanical properties of the shape memory alloy vary greatly over the temperature range spanning their transformation.

SMA materials exhibit a modulus increase of 2.5 times and a dimensional change of up to 8% (depending on the amount of pre-strain) when heated above its so-called Martensite to Austenite phase transition temperature. The SMA can be embedded within the headrest in wire form to provide the desired amount of contraction or change in stiffness properties, wherein the term "wire" is non-limiting and shall incorporate other suitable geometric shapes, such as cables, bundles, braids, ropes, straps, etc. SMA changes are also one-way so that a biasing force return mechanism (such as a spring) may be included within the headrest to return the SMA (and the headrest) to its starting configuration once the applied field/heat is removed. Other return mechanisms may include mechanical, pneumatic, hydraulic, or pyrotechnic technology, or be based on one of the aforementioned smart materials.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Ferromagnetic SMA's exhibit rapid dimensional changes of up to several percent in response to (and proportional to the strength of) an applied magnetic field. The changes are one-way changes and require the application of either a biasing force or a field reversal to return the ferromagnetic SMA to its starting configuration. Otherwise, for the intents and purposes of the present invention, FSMA functions equivalently to SMA.

Similarly, magnetostrictives are solids that develop a large mechanical deformation when subjected to an external magnetic field. This magnetostriction phenomenon is attributed to the rotations of small magnetic domains in the materials, which are randomly oriented when the material is not exposed to a magnetic field. The shape change is largest in ferromagnetic or ferrimagnetic solids. Terfinol D is the most thoroughly explored form of magnetostrictive. Magnetostrictives exhibit a relatively high frequency capability. Strain of a magnetostrictive is proportional to the strength of the applied magnetic field. These types of materials return to their starting dimension upon removal of the applied field.

Shape memory polymers (SMP) exhibit a dramatic drop in modulus when heated above the glass transition temperature of that of their constituents that has a lower glass transition temperature. If loading/deformation is maintained while the temperature is dropped, the deformed shape will be set in the SMP until it is reheated while under no load under which condition it will return to its as-molded shape. When heated their modulus drops by a factor of 30 or more and in this flexible state the stored energy could no longer be blocked by the SMP and would thus be released in this manner allowing the front surface of the headrest to be displaced toward the head of the seated occupant.

Most SMPs exhibit a "one-way" effect, wherein the SMP exhibits one permanent shape. Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature. Repeating the heating, shaping, and cooling steps can repeatedly reset the temporary shape.

As previously stated, most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 20° C. Another temperature for shape recovery may be greater than or equal to about 70° C. Another temperature for shape recovery may be less than or equal to about 250° C. Yet another temperature for shape recovery may be less than or equal to about 200° C. Finally, another temperature for shape recovery may be less than or equal to about 180° C. Suitable polymers for use in the SMPs include thermoplastics, thermosets, interpenetrating networks, semi-interpenetrating networks, or mixed networks of polymers. The polymers can be a single polymer or a blend of polymers. The polymers can be linear or branched thermoplastic elastomers with side chains or dendritic structural elements.

Finally, suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, poly-ortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). The polymer(s) used to form the various segments in the SMPs described above are either commercially available or can be synthesized using routine chemistry. Those of skill in the art can readily prepare the polymers using known chemistry and processing techniques without undue experimentation.

II. Exemplary Headrests and Methods of Use

Figure 1:
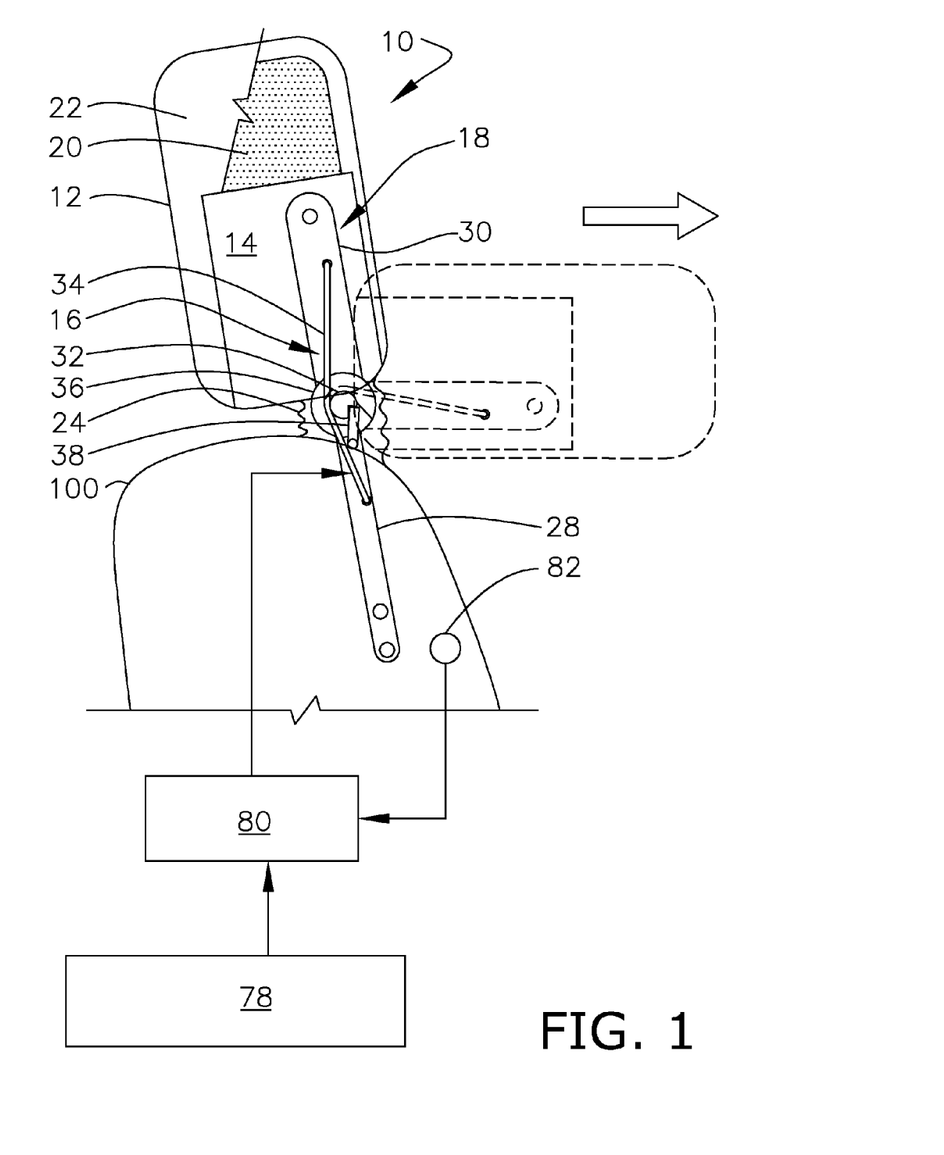
FIG. 1 is a partial side elevation of a seat and a headrest movable between deployed (solid-line type) and stowed (hidden-line type) positions, particularly illustrating a pivotally movable linkage system, including a selectively deployable arm pivotally coupled to the seat, and a shape memory wire and torsion spring drivenly coupled to the arm, in accordance with a preferred embodiment of the invention.

Turning to FIGS. 1-6b, the preferred headrest 10 generally includes a shell 12 defining an interior space 14 and is shiftable between first and second positions, shapes, or otherwise configurations. More preferably, the headrest 10 presents a plurality of selectively achievable second positions. An active material actuator 16 is disposed within and drivenly coupled to the shell 12 or a linkage system 18 so as to cause or enable the shell 12 to be manipulated autonomously. As shown in FIG. 1, the preferred headrest 10 includes a padding material 20 exterior to and forming superjacent layers with the shell 12, and an outer covering 22 (of soft durable material) encasing the padding material 20 to define the overall shape of the headrest 10. Any exposed portion of the linkage system 18 is preferably encased in a conformable covering 24 (of soft durable material) for aesthetics and to internalize the linkage system 18 and eliminate pinch points.

Generally, where structural components such as a linkage system 18, support posts 26, etc., are present, it is preferred that two identical components in mechanical parallel are employed to reduce undesired bending and twisting loads on the linkage system 18, posts 26, and headrest 10. In addition, the components are preferably coupled to either side of and equidistant from the lateral midplane of the seat 100. The structural components should be structurally configured to withstand external dynamic loading, for example, from the head of a passenger during a crash event.

In an exemplary embodiment shown in FIG. 1, the headrest 10 includes a linkage system 18 disposed within the interior space 14; the linkage system 18 includes an anchor 28 fixedly coupled to the seat 100, and a selectively deployable member 30 fixedly or movably coupled to the shell 12 and movably coupled to the anchor 28 via at least one hinge 32. The actuator 16 includes an active material element 34 drivenly coupled to the linkage system 18, and a spring-loaded mechanism (e.g., torsion spring) 36 engaging the shell 12 and operable to bias the shell 12 towards a first position.

More particularly, the preferred member 30 is fixedly coupled to the shell 12, and pivotally coupled to the anchor 28 via a single hinge 32. As such, the shell 12 is caused to pivot between positions. The linkage system 18 preferably includes a locking mechanism 38 (e.g. latch, catch, etc.) operable to selectively retain or "lock" the member 30 when the shell 12 is in a deployed position (solid-line type). The active material element 34 is preferably a pre-stretched (up to 8%) shape memory alloy wire drivenly coupled to the deployable member 30 and anchor 28, and wrapped around the hinge 32 to maximize displacement. Thus, the wire 34 pulls the shell 12 to a deployed position when the wire 34 is activated (i.e., exposed to an activation signal sufficient to cause a transformation in state). The locking mechanism 38 retains the shell 12 in the deployed position as the wire is then deactivated. The spring-loaded mechanism 36 is preferably a torsion spring coiled around the hinge 32 and biasing the shell 12, such that when the locking mechanism 38 is caused to disengage the member 30, the spring 36 pulls the shell 12 to a stowed position (hidden-line type). Other types of springs 36 include tension and compression springs, cantilever springs, and leaf springs. The shell 12 may be stowed in many positions, but is preferably stowed in a forward direction (depicted by a hollow arrow in FIGS. 1, and 3) to dissuade passenger occupation of the seat 100 when the headrest 10 is not deployed.

In another embodiment, the seat defines a cavity 40, and the shell 12 is partially or fully disposed within the cavity 40 when the headrest 10 is in the stowed condition. The linkage system 18 includes a plurality of interconnected track sections 18, telescoping rods, or other interconnected members to effect slidable translation and thus extend/retract the shell 12. The linkage system 18 further includes at least one stop 44 configured to engage the sections 18, so as to prevent further motion thereby, when in the fully deployed position. The actuator 16 includes a locking mechanism 38 operable to selectively retain or "lock" the headrest 10 in one of the plurality of achievable positions.

Figure 2:
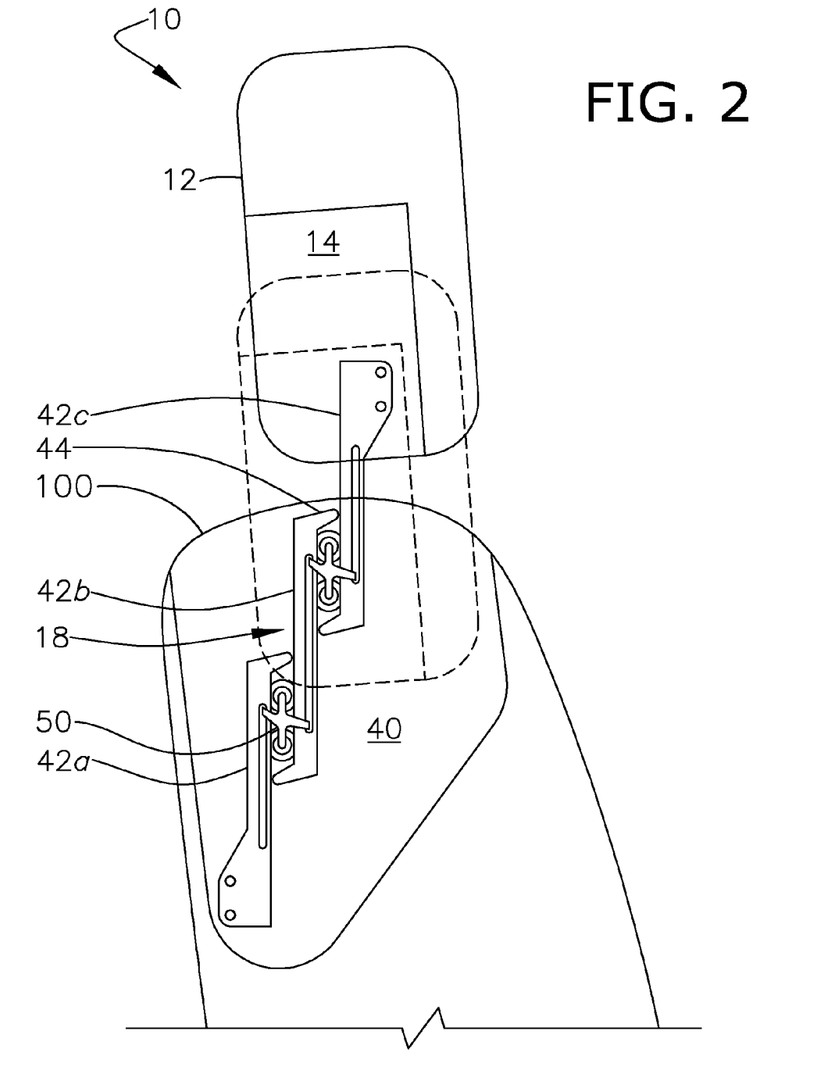
FIG. 2 is a side elevation of a seat defining a cavity, and a headrest including a linkage system, wherein the system further includes a plurality of interconnected track sections, rollers, and stops, in accordance with a preferred embodiment of the invention.
Figures 2A, 2B:
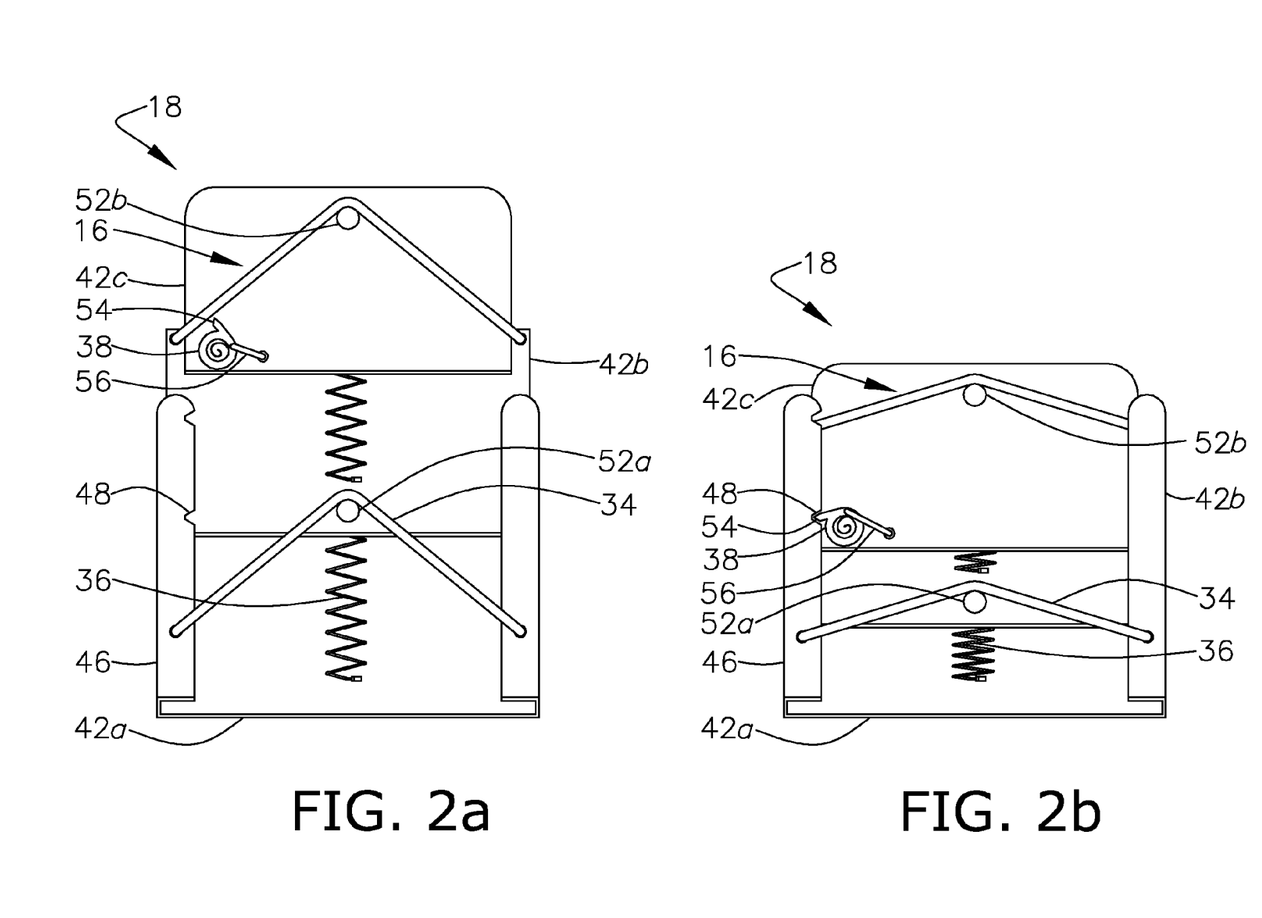
FIG. 2a is an elevation of the linkage system shown in FIG. 2, particularly illustrating an actuator including two shape memory wires and two compression springs, and a spring-biased latch including a shape memory wire, wherein the linkage system is in a deployed position, in accordance with a preferred embodiment of the invention.
FIG. 2b is the linkage system shown in FIG. 2a, wherein the wires have been activated, the track sections collapsed, and the latch engages the linkage system, so as to secure the system in a stowed position.

As shown in FIGS. 2-2b, the linkage system 18 is preferably three slidably interconnected track sections 18, wherein the lower section 42a is fixedly coupled to the seat 100 and includes two side rails 46 defining a plurality of recesses 48 (FIGS. 2a,b), the middle section 42b is slidably coupled to the lower section 42a and top section 42c, and the top section 42c is preferably fixedly coupled to the shell 12. Additionally, the linkage system 18 preferably employs friction reducers 50 such as rollers (FIG. 2), ball bearings, or lubricant (e.g., grease, etc.) between moving surfaces.

FIG. 2a shows a middle nub 52a and top nub 52b fixedly attached to the middle section 42b and top section 42c, respectively, and shape memory wires 34 fixedly attached to the lower section 42a and middle section 42b, and wrapped around the middle nub 52a and top nub 52b, respectively, to create two bow-string configurations, so as to magnify the displacement caused by activation. The actuator 16 further includes two compression springs 36 interconnecting the lower section 42a and middle section 42b, and the middle section 42b and top section 42c, and compressed, or "loaded," when the headrest 10 is in a stowed position (FIG. 2b).

Lastly, the locking mechanism 38 is preferably a spring-biased latch 38 pivotally attached to the top track section 42c, and including a prong 54 biased towards and inter-engaging one of the plurality of recesses 48 when the headrest 10 is in the stowed condition (FIG. 2b). Another active material element 56 (e.g. cord) interconnects the latch 38 and top section 42c and is operable to selectively disengage the prong 54 from the recess 48 when activated. When the cord 56 is deactivated, the spring-biased latch 38 pivots, causing the prong 54 to engage the recess 48, such that the recess 48 holds the top section 42c in place.

The cord 56 is preferably a shape memory alloy wire 56 pre-stretched up to 8% based on commercially available shape memory alloys, to remove slack and provide instantaneous action. The length of the wire 56 is chosen preferably such that when partially (e.g. 50%, more preferably 25%, most preferably 10%) activated (e.g., through thermal heating and the like) the change in length causes the prong 54 to completely disengage the recess 48. The plurality of engagable recesses 48 enables the headrest 10 to be locked in a plurality of positions. Thus, to stow the headrest 10, the wires 34 are activated, retracting the shell 12. The latch cord 56 is deactivated, locking the headrest 10 in the stowed condition. To deploy the headrest 10, the latch cord 56 is activated, disengaging the linkage system 18, and the compressed springs 36 then extend the shell 12 to the deployed condition.

In another embodiment, the headrest 10 includes a four-bar linkage system, which enables the shell 12 to achieve more complex movement between positions. The four-bar linkage system 18 includes a ground link 58 and two grounded (pivotal) links 60. An optional coupler link 62 (preferred) is included and fixedly attached to the shell 12 and pivotally attached to the two grounded links 60; alternatively, the grounded links 60 are pivotally attached to the shell 12 and the coupler link 62 is omitted.

Figure 3:
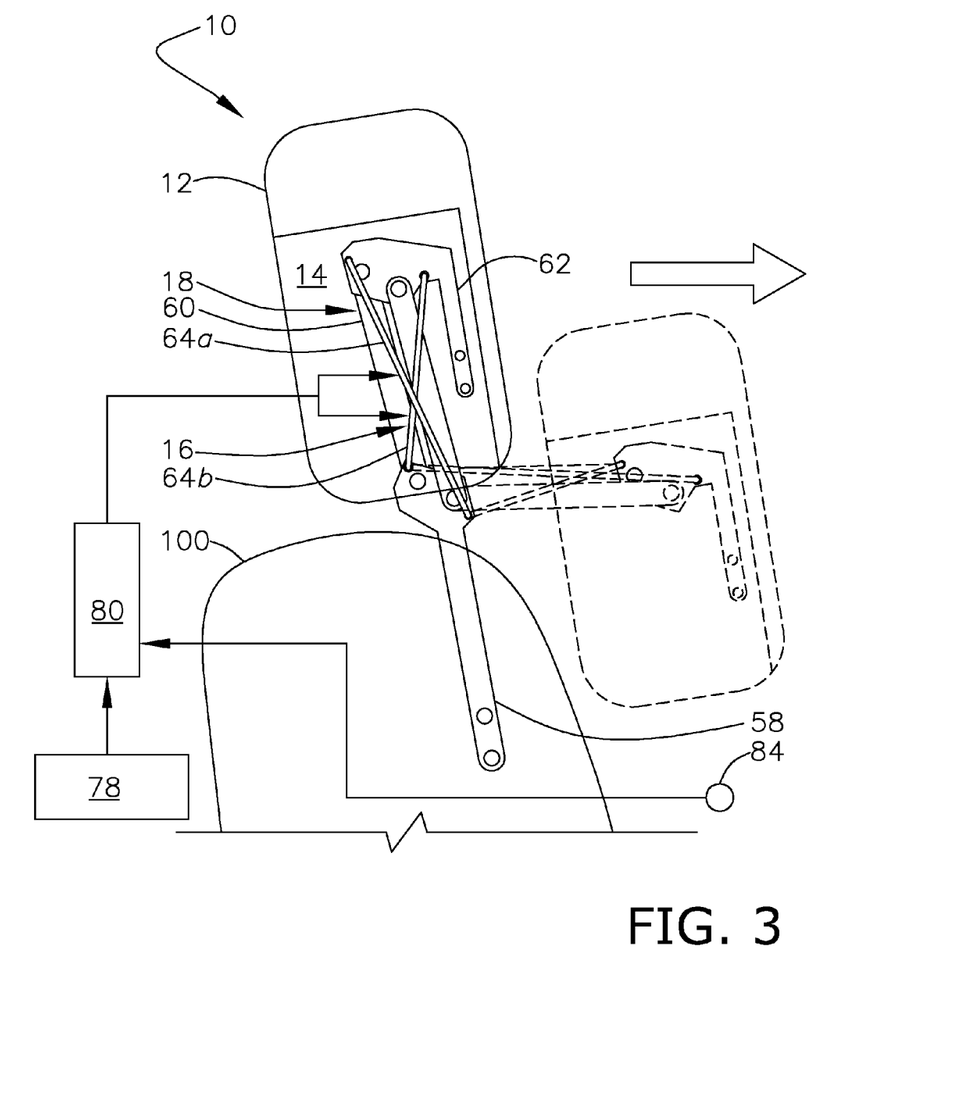
FIG. 3 is a side elevation of a seat and a headrest, including a parallel four-bar linkage system, and an actuator including a first and second shape memory wire, in accordance with a preferred embodiment of the invention.

The actuator 16 includes a second active material element 64b drivenly coupled to the four-bar linkage system 18 so as to be antagonistically paired with a first element 64a, such that the second active material element 64b is operable to selectively return the linkage system 18 to the first position. As shown in FIG. 3, the four-bar linkage system 18 is preferably a parallel four-bar linkage system, which enables the shell 12 to translate between positions without pivoting. The elements 64a,b are preferably pre-stretched shape memory wires as described above.

In yet another embodiment, the headrest 10 includes a conformable shell 12 defining a first geometric shape (FIG. 4a), an actuator 16 and a contractible linkage system 18, which causes the shell 12 to transform to a second shape (FIG. 4b) when contracted. The first shape defines a deployed condition and displaces a larger volume than the second shape which defines a stowed condition. The headrest 10 further includes at least one support post 26 fixedly coupled to the seat and shell 12. The shell 12 defines at least one fold 66 when in the stowed condition.

Figure 4A:
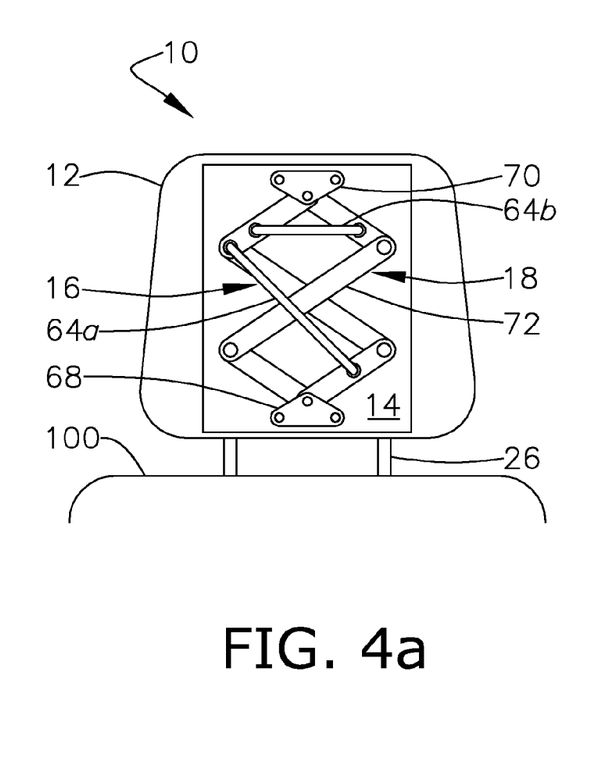
FIG. 4a is an elevation of a conformable headrest presenting a first shape, and including a scissor mechanism and an actuator including first and second shape memory wire, wherein the first wire has been activated and the headrest is in a deployed condition, in accordance with a preferred embodiment of the invention.
Figure 4B:
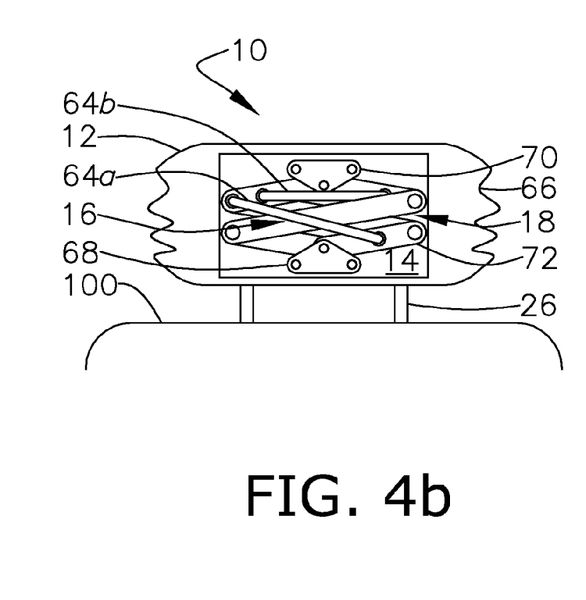
FIG. 4b is an elevation of the headrest shown in FIG. 4a, wherein the first and second shape memory wires have been deactivated and activated, respectively, the scissor mechanism has been collapsed, and the headrest caused to achieve a second shape presenting bellowed lateral sides.

More particularly, the linkage system 18 is preferably a scissor mechanism 18 including a base plate 68 and a deployable plate 70 fixedly coupled to the shell 12, and a plurality of intermediate members 72 interconnecting the base plate 68 and deployable plate 70. The base plate 68 is preferably stationary, whereas the deployable plate 70 is operable to be deployed and retracted by the intermediate members 72. The actuator 16 includes a first and second active material element 64a,b drivenly coupled to the intermediate members 72 and antagonistically paired, such that the first element 64a is operable to cause the linkage system 18 to achieve the second condition (FIG. 4b), and the second active material element 64b is operable to selectively return the linkage system 18 to the first condition (FIG. 4a). The shell 12 preferably defines a plurality of folds 66, so as to present bellowed or accordion-type lateral sides when the headrest 10 is stowed.

Figure 5A:
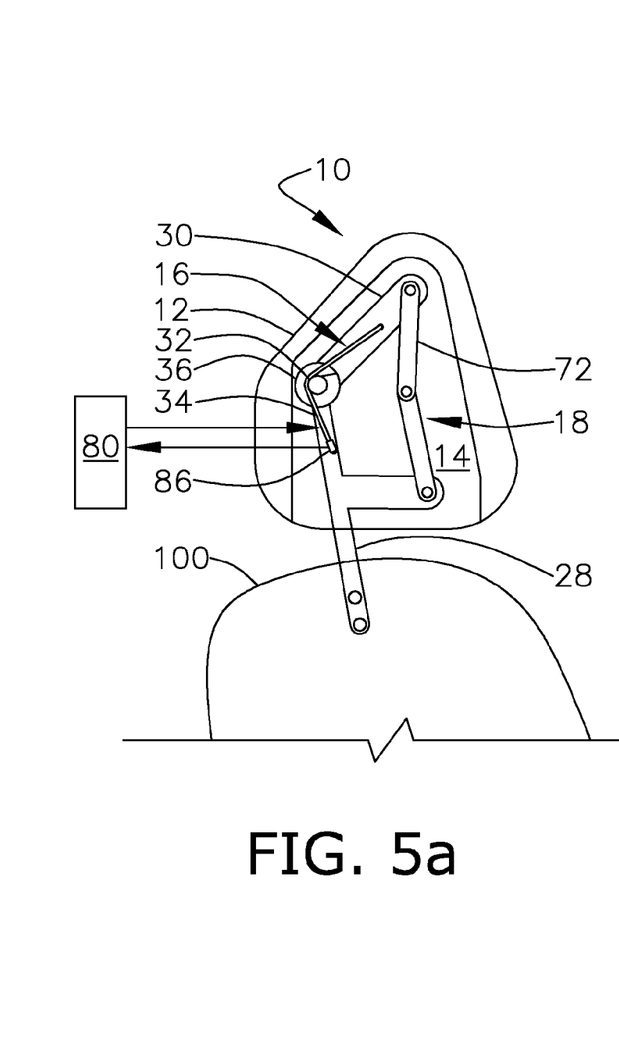
FIG. 5a is a side elevation of a headrest including a multibar linkage system and shape memory wire actuator, wherein the headrest presents a first shape, and deployed condition, in accordance with a preferred embodiment of the invention.

In a variation of the previous embodiment, the linkage system 18 includes an interconnected anchor 28, intermediate members 72, and a deployable member 30, and an active material element 34 and spring-loaded mechanism 36 drivenly coupled to the deployable member 30. The spring-loaded mechanism 36 biases the shell 12 into a second (stowed) condition (FIG. 5b), wherein the shell 12 defines a fold 66. When the element 34 is activated, the deployable member 30 pivots, causing the intermediate members 72 to extend outward and fill out the shell 12, returning the linkage system 18 to a first (deployed) condition (FIG. 5a). As shown in FIGS. 5a,b, the deployable member 30 preferably pivots via a hinge 32 pivotally coupled to the anchor 28, the active material element 34 is preferably a shape memory wire 34 wrapped around the hinge 32, and the spring-loaded mechanism 36 is preferably a torsion spring 36 coiled around the hinge 32.

In another embodiment, the shell 12 defines an interior surface 74. The actuator 16 includes at least one active material element 34, at least one spring-loaded mechanism 36, and at least one shape memory polymer layer 76 disposed within the space 14 and conforming and attached to, or embedded in, the interior surface 74. The shell 12 presents a first shape (FIG. 6a) and the layer 76 is operable to selectively cause the shell 12 to achieve a second shape (FIG. 6b), when the layer 76 is activated and subjected to a load. The element 34 is operable to apply the load when activated. When activated in the absence of a load, the layer 76 returns the shell 12 to the first shape.

Figure 6A:
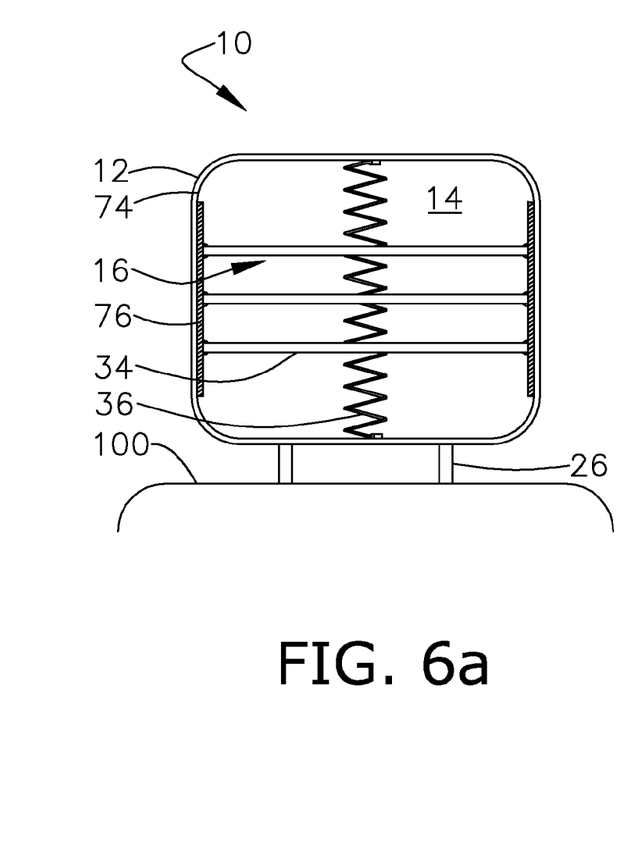
FIG. 6a is an elevation of a selectively conformable headrest comprising shape memory polymer, including a plurality of shape memory wire actuators, and presenting a first shape, in a deployed condition, in accordance with a preferred embodiment of the invention.
Figure 6B:
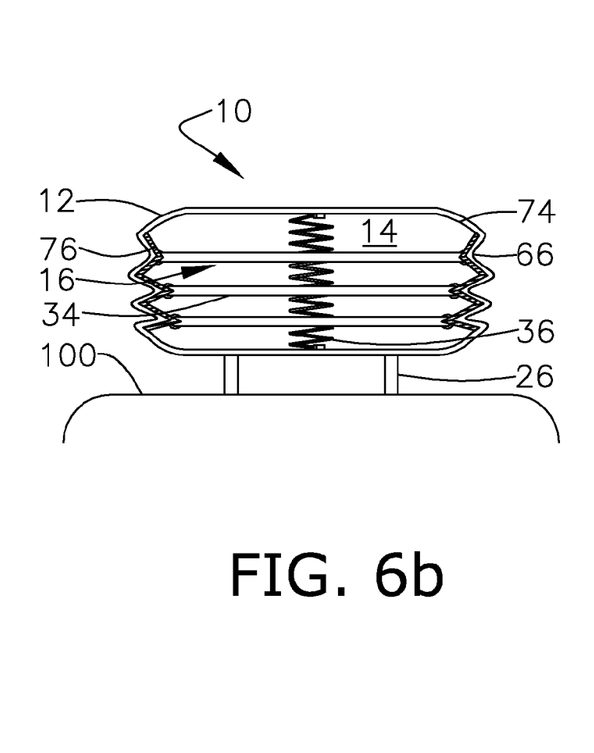
FIG. 6b is a front elevation of the headrest shown in FIG. 6a, wherein the actuators have been activated, and the headrest has been caused to achieve a second collapsed shape having bellowed lateral sides, in a stowed condition.

FIGS. 6a,b show an actuator 16 including two layers 76 conforming to opposite sides of the interior surface 74, three shape memory wires 34 interconnecting the two layers 76, and a compression spring 36 interconnecting the top and bottom of the interior surface 74. When both the wires 34 and layers 76 are activated, the wires 34 pull the layers 76 inward at the points of interconnection, causing folds 66 to form on the lateral sides, and compressing the spring 36, and thus achieving the second (stowed) shape (FIG. 6b). When only the layers 76 are reactivated, the spring 36 extends, and the layers 76 return to their original shape, stretching the wires 34 and causing the shell 12 to return to the initial (deployed) shape (FIG. 6a).

Generally, it is appreciated that a power source 78 is communicatively coupled to the actuator 16, and operable to generate the activation signal (FIG. 1). In an automotive application, for example, the source 78 may be the vehicle charging system or a capacitor (not shown) operable to effect sufficient discharge of energy.

The actuator 16 may be triggered autonomously or on-demand. With regard to the former, the actuator 16 is triggered upon determining a condition to deploy, stow, or otherwise move/transform the headrest 10. For example, the headrest 10 may be configured to detect a gear shift to reverse, a load change due to occupation or evacuation of the seat 100, a dynamic load of the occupant generated by the inertial transfer during an automotive sudden stop/crash event or otherwise determined pre-crash condition, a door opening or closing event, or a seatbelt latching/unlatching event. As such, a controller 80 and sensor 82 may be communicatively coupled to the actuator 16 and source (FIG. 1). The controller 80 and sensor 82 are cooperatively configured to cause the actuator 16 to become exposed to the signal. Types of sensors 82 include, but are not limited to, position sensors, pressure sensors, displacement sensors, velocity sensors, and accelerometers. The sensor 82 can be located in and about the seat 100, headrest 10, door, and seatbelt (not shown). In another aspect of the invention, it is appreciated that a seat memory selection switch could be used to autonomously position the headrest 10 so as to accommodate a given passenger (not shown).

With respect to on-demand activation, the actuator 16 may be triggered when receiving a user input from an input device 84 (FIG. 3). For example, the driver (not shown) may elect to stow the unused headrest 10 for improved driving by pushing a button, or a passenger may push a toggle to receive extra head support. As such, a controller 80 and input device 84 may be communicatively coupled to the actuator 16 and source 78 (FIG. 3). The controller 80 and input device 84 are cooperatively configured to cause the actuator 16 to become exposed to the signal. Types of input devices 84 include, but are not limited to, a switch, a turn signaler, a door lock, a push-button, a toggle, and a gear shift (not shown). The input device 84 can be located on or in the seat 100, headrest 10, door, dashboard, console, steering wheel, gear shifter, etc. (not shown). Analogous to the seat memory selection, a preset occupant identification feature could be used to position the headrest 10 on demand.

Figure 5B:
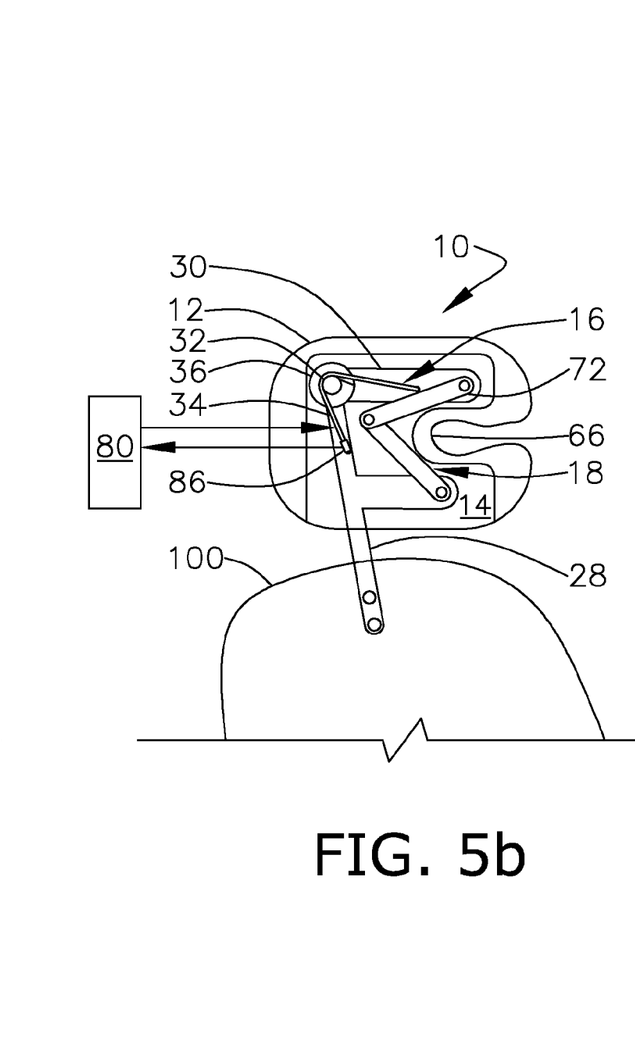
FIG. 5b is a side elevation of the headrest shown in FIG. 5a, wherein the wire has been activated, and the headrest caused to achieve a second shape, and stowed condition.

Finally, it may be desirable to govern the actuator 16 to protect the invention, particularly the active material element 34, and passenger (not shown) from undesirable variable values of force, heat, current, bending, fatigue, stress, strain, or other variables. To that end, a load-limiting mechanism 86 may be communicatively coupled to the active material element 34 to detect an undesirable variable value. In a preferred embodiment, a piezoelectric sensor 86 is communicatively coupled to the active material element 34 and a controller 80 (FIG. 5*a,b*), and the sensor 86 and controller 80 are collectively operable to detect a large strain, indicating undesirable loading, on the actuator 16 when an object or body part of the operator (not shown) is obstructing the path of the headrest 10, and autonomously terminate movement/transformation of the headrest 10.

While this disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims. Further description, explanation, and exemplary embodiments offered by the various appendices attached hereto are hereby incorporated by reference, as exemplary but non-limiting teachings of the present invention.

What is claimed is:

1. A headrest adapted for use with a rear seat, said headrest comprising:
    an exterior shell movably coupled to the seat, and defining a first position relative to the seat;
    an interior space having a fixed volume defined by the exterior shell;
    a mechanical linkage system affixed to any of the shell or the seat, the mechanical linkage system including a plurality of track sections, at least one of which is fixedly coupled to the seat and at least one other of which is slidably translatable with respect to the at least one track section, the mechanical linkage system being operable to extend and retract the shell;
    a nub fixedly attached to the at least one other track section;
    an actuator disposed within the space, wherein the actuator includes at least one active material element drivenly coupled to the shell so as to selectively cause or enable the headrest to move to a second position when the element is exposed to or occluded from an activation signal, wherein the active material element is a shape memory alloy (SMA) wire having two ends, the SMA wire being in a bow-string configuration where i) each end is fixedly attached to the at least one track section, and ii) a portion of the SMA wire is retained by the nub; and
    a power source communicatively coupled to the actuator, and operable to generate the signal;
    wherein the seat defines a cavity operable to retain at least a portion of the shell, and the at least the portion is disposed within the cavity when the shell is in the second position.

2. The headrest as claimed in claim 1, wherein the actuator includes a spring-loaded mechanism engaging the shell, so as to bias the shell towards one of the positions.

3. The headrest as claimed in claim 1, further comprising:
    a latch operable to selectively lock the headrest in one of the positions.

4. The headrest as claimed in claim 1, wherein the second position is one of a plurality of achievable positions.

5. The headrest as claimed in claim 1, wherein the power source is selected from the group consisting of a vehicle charging system, and a capacitor having stored energy.

6. The headrest as claimed in claim 1, further comprising:
    an input device selected from the group consisting of a turn signaler, a door lock, and a gear shift, wherein the input device is communicatively coupled to the actuator and operable to receive an input, so as to selectively activate the actuator when the input is received.

7. The headrest as claimed in claim 1, further comprising:
    a sensor operable to detect a condition; and
    a controller communicatively coupled to the sensor, wherein the controller and the sensor are cooperatively configured to autonomously cause the element to become exposed to or occluded from the signal, when the sensor detects the condition.

8. The headrest as claimed in claim 7, wherein the condition is selected from the group consisting of a door closing event, a door opening event, a crash event, a pre-crash determination, and a seatbelt latching event.

9. The headrest as claimed in claim 1, further comprising a load-limiting mechanism operable to selectively cause the element to be occluded from the signal when the element is activated and the shell is unable to move freely.

10. A headrest adapted for use with a rear seat, said headrest comprising:
    an exterior shell movably coupled to the seat, and defining a first position relative to the seat;
    an interior space having a fixed volume defined by the exterior shell;
    a mechanical linkage system affixed to any of the shell or the seat, the mechanical linkage system including a plurality of track sections, at least one of which is fixedly coupled to the seat and at least one other of which is slidably translatable with respect to the at least one track section, the mechanical linkage system being operable to extend and retract the shell;
    a nub fixedly attached to the at least one other track section;
    an actuator disposed within the space, wherein the actuator includes at least one active material element drivenly coupled to the shell so as to selectively cause or enable the headrest to move to a second position when the element is exposed to or occluded from an activation signal, wherein the active material element is a shape memory alloy (SMA) wire having two ends, the SMA wire being in a bow-string configuration where i) each end is fixedly attached to the at least one track section, and ii) a portion of the SMA wire is retained by the nub;
    a power source communicatively coupled to the actuator, and operable to generate the signal;
    a third of the plurality of track sections slidably translatable with respect to the at least one other track section;
    an other nub fixedly attached to the third of the plurality of track sections; and
    a second shape memory alloy (SMA) wire having two ends, the second SMA wire being in a second bow-string configuration where i) each end is fixedly attached to the at least one other track section, and ii) a portion of the second SMA wire is retained by the other nub.

\* \* \* \* \*